US011971151B2

(12) United States Patent

Mahel

(10) Patent No.: US 11,971,151 B2

(45) Date of Patent: Apr. 30, 2024

(54) SIGNAL LIGHTING DEVICE OR LIGHTING DEVICE FOR MOTOR VEHICLE HEADLAMP

(71) Applicant: ZKW Group GmbH, Wieselburg (AT)

(72) Inventor: Petr Mahel, Olomouc (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/369,495

(22) Filed: Sep. 18, 2023

(65) Prior Publication Data

US 2024/0093853 A1 Mar. 21, 2024

(30) Foreign Application Priority Data

Sep. 20, 2022 (EP) .................................... 22196548

(51) Int. Cl.

*F21S 43/239* (2018.01)

*F21S 41/24* (2018.01)

(Continued)

(52) U.S. Cl.

CPC ............. *F21S 43/239* (2018.01); *F21S 43/14* (2018.01); *F21S 43/315* (2018.01); *F21V 7/041* (2013.01);

(Continued)

(58) Field of Classification Search

CPC ...... F21S 43/239; F21S 43/241; F21S 43/245; F21S 41/24

See application file for complete search history.

(56) References Cited

U.S. PATENT DOCUMENTS 10,690,307 B2 * 6/2020 Gromfeld ............... F21S 41/43

11,835,193 B2 * 12/2023 Hashiba ................ F21S 43/245

(Continued)

FOREIGN PATENT DOCUMENTS

DE 102017105838 A1 9/2018

EP 2317214 A1 5/2011

(Continued)

OTHER PUBLICATIONS

Extended European Search Report for European Application No. 22196548.6 dated Feb. 21, 2023 (5 Pages).

*Primary Examiner* — Sean P Gramling

(74) *Attorney, Agent, or Firm* — Eversheds Sutherland (US) LLP

(57) ABSTRACT

A signal lighting device or lighting device, for a motor vehicle headlight, including light sources for emitting light rays and a light guiding body (LGB) with two light-emitting surfaces (LESs). The LGB includes a beam splitting device with a total internal reflection surface (TIRS), which totally reflects part of the incident light rays and deflects them from the light guide main propagation direction to one of the LESs. The TIRS has individual optical structures (OS), which allow incident light rays to pass through to the other LES. Each OS is designed as a recess in the TIRS, the recess, starting from an opening in the LGB, being delimited by lateral surfaces extending into the LGB. One lateral surface (the base surface) is oriented such that light rays pass through it toward the first LES. Each opening occupies an area on the TIRS, which has an opening surface area $A_{B,i}$, the TIRS has a total surface area $A_{ges}$, wherein $A_{ges}$ is the sum of all opening surface areas, and the first LES has a first surface area $A_1$ and the second LES has a second surface area $A_2$, and wherein $\Sigma_i A_{B,i}/(A_{ges}-\Sigma_i A_{B,i})=A_1/A_2$.

20 Claims, 4 Drawing Sheets

(51) Int. Cl.

| | |
|---|---|
| ***F21S 43/14*** | (2018.01) |
| ***F21S 43/31*** | (2018.01) |
| ***F21V 7/04*** | (2006.01) |
| *F21W 103/20* | (2018.01) |
| *F21W 103/55* | (2018.01) |
| *F21Y 115/10* | (2016.01) |

(52) U.S. Cl.
CPC ..... *F21W 2103/20* (2018.01); *F21W 2103/55* (2018.01); *F21Y 2115/10* (2016.08)

(56) References Cited

U.S. PATENT DOCUMENTS

| | | | | |
|---|---|---|---|---|
| 2016/0138772 A1* | 5/2016 | Sato | F21S 43/40 362/511 |
| 2018/0149326 A1 | 5/2018 | Paroni et al. | |
| 2019/0128492 A1 | 5/2019 | Gloss et al. | |

FOREIGN PATENT DOCUMENTS

| | | | |
|---|---|---|---|
| EP | 2354637 A2 | 8/2011 |
| WO | 2017068309 A1 | 4/2017 |

* cited by examiner

SIGNAL LIGHTING DEVICE OR LIGHTING DEVICE FOR MOTOR VEHICLE HEADLAMP

CROSS-REFERENCE TO RELATED APPLICATIONS

This application claims priority to European Patent Application No. 22196548.6, filed Sep. 20, 2022, which is incorporated herein by reference.

FIELD OF THE INVENTION AND DESCRIPTION OF PRIOR ART

The invention relates to a signal lighting or lighting device for a motor vehicle or for a motor vehicle headlight, comprising:

- at least one light source for emitting light rays,
- a light guiding body associated with the at least one light source, wherein the light guiding body has an entry section and a light exit area, wherein light rays emitted by the at least one light source enter the light guiding body via the entry section, propagate in the light guiding body, and exit the light guiding body via the light exit area, wherein the light exit area comprises two light-emitting surfaces, wherein the entry section is designed in such a way, for example in the form of a collimator, that the light rays emitted by the at least one light source are oriented substantially in a light guide main direction of propagation, and wherein the light guiding body comprises a beam splitting device, wherein the beam splitting device comprises a total internal reflection surface, which totally reflects at least part of the light rays incident thereon such that these light rays propagate in the light guiding body in a direction deviating from the light guide main direction of propagation, and wherein the total internal reflection surface has individual optical structures, which are designed in such a way that at least part of the light rays incident on an individual structure exit the light guiding body via the individual structure, enter the light guiding body again via a re-entry surface, wherein the re-entered light rays are directed to one of the light-emitting surfaces, the "first" light-emitting surface, which first light-emitting surface is opposite to the re-entry surface, such that these light rays can exit the first light-emitting surface in a main emission direction, and wherein the light rays totally reflected by the total internal reflection surface are totally reflected at a rear side of the light guiding body and thereby deflected to the second light-emitting surface, where the light rays exit the light guiding body in the main emission direction, wherein each individual optical structure is designed as a recess in the total internal reflection surface, wherein a recess, starting from an opening in the light guiding body, is delimited by lateral surfaces extending into the light guiding body, wherein one of the lateral surfaces, the so-called base surface, is oriented in such a way that light rays incident thereon pass through the base surface in the direction of the first light-emitting surface.

Furthermore, the invention relates to a motor vehicle headlight comprising one or more such devices.

In addition, the invention relates to a motor vehicle comprising one or more such devices and/or one or more motor vehicle headlights in accordance with the invention.

With such a device, for example, two light functions, such as daytime running light (DRL) and a direction indicator (DI), can be produced with a single light guiding body. For this purpose, the light guiding body has two light-emitting surfaces, which form a common total light-emitting surface.

For design reasons, specially shaped light-emitting surfaces are often desirable. In the case of the device in question, two light-emitting surfaces are provided, for example, which are typically different sizes and/or differently shaped.

By way of example, the two light-emitting surfaces lie one on top of the other, wherein one of the light-emitting surfaces, e.g. the upper one, is at the same height, i.e. opposite one or more light sources that can inject light into the light body.

A beam splitting device is provided in the light guiding body, which splits the injected light between the two light-emitting surfaces.

It has proven problematic to achieve a homogeneous appearance with such a device in the event that light is emitted via both light-emitting surfaces at the same time. As a result, it is often necessary to choose a two-part design with two light guiding bodies, which, however, runs contrary to the frequent desire for a one-piece design.

SUMMARY OF THE INVENTION

It is accordingly an object of the invention to provide a solution for how a homogeneous appearance can be achieved for a device described in the introduction.

This object is achieved with a device described in the introduction by virtue of the fact that according to the invention, each opening occupies an area, the so-called opening area, on the total internal reflection surface, wherein an opening area has an opening surface area $A_{B,i}$, the total internal reflection surface has a total surface area $A_{ges}$, wherein $A_{ges}$ is the sum of all opening surface areas, and the first light-emitting surface has a first surface area $A_1$ and the second light-emitting surface has a second surface area $A_2$, and wherein $$\Sigma_i A_{B,i}/(A_{ges}-\Sigma_i A_{B,i})=A_1/A_2$$

The general formula applies assuming that the recesses, i.e. in particular the openings of the recesses, can be different sizes. It is preferably provided that the recesses, in particular their openings, are the same size, i.e. have the same opening surface area. If n recesses are provided, the above formula is simplified ($A_B$ is the surface area of the opening surface area of a recess) to $$n\, A_B/(A_{ges}-n\, A_B)=A_1/A_2$$

The opening surfaces lie in the plane of the total internal reflection surface, assuming that the total internal reflection surface is flat. As described below, the total internal reflection surface can be faceted, i.e. divided into several, preferably flat facets. In this case, the opening surfaces lie in the plane of the respective facet from which the recess extends into the light guiding body.

The design according to the invention ensures that the light emitted by the light source(s) is divided according to the size ratio of the two light-emitting surfaces such that it can be ensured that both light-emitting surfaces are illuminated with the same luminous intensity and thus have the same luminance or surface brightness.

It can be provided that one of the light-emitting surfaces, for example the lower light-emitting surface, has a larger surface area than the other, for example the upper light-emitting surface.

Advantageous embodiments of the invention are described in the dependent claims.

It can be provided that the further lateral surfaces are oriented substantially parallel to or in the direction of the light rays incident on the individual structure, i.e. preferably parallel to the main emission direction.

This ensures that these lateral surfaces do not influence the light rays striking the recess or influence them as little as possible.

By way of example, it is provided that the recesses are pyramid-shaped, with a triangular opening, base surface and two lateral surfaces extending into the light guiding body.

"Triangular" does not necessarily mean that the connecting lines between two corner points of the "triangle" must be straight (in this respect it is a "modified" triangle). Likewise, "pyramid-shaped" means that the design of the recess is similar, but not necessarily identical, to a pyramid, for example by lateral surfaces not being flat, but rather curved.

It can be provided that the recesses are cylindrical at least in sections.

In this case, the recess is a "cut-out" in the light guiding body or in the total internal reflection surface, wherein a lateral surface of the recess is formed in the shape of part of a cylinder jacket. This lateral surface or the height of the cylinder jacket runs substantially vertically.

The incident light rays are directed to the first light-emitting surface via this surface.

The recess is delimited by three further, preferably flat, lateral surfaces, which "open out" into the opening of the recess.

The base surface is preferably curved, in particular into the light guiding body.

A surface normal to the base surface thus runs substantially parallel to the light guide main direction of propagation, wherein, for example, it is provided that the surface normal runs through the geometric centre point of the lateral surface and runs in particular normal to a tangential surface to the base surface at this centre point.

This curvature can provide a splitting/expanding effect on an incident light beam of parallel light rays S1 such that the light rays are uniformly distributed over the light-emitting surface and it shines uniformly brightly.

It can be provided that the other lateral surfaces are flat.

By way of example, two outer lateral surfaces and a base lateral surface, which are preferably flat, are provided for a cylindrical recess.

The flat lateral surfaces preferably extend parallel to the light guide main direction of propagation.

It can in particular be provided that the individual structures are distributed uniformly and/or in rows and/or in columns over the total internal reflection surface.

This ensures that the first light-emitting surface, but also the second light-emitting surface, is "supplied" with light from the light sources over as full an area as possible.

It can be provided that two or more light sources are provided, wherein the entry section is designed in such a way respectively for one or for more of the light sources, for example in the form of a collimator, that the light rays emitted by each light source are oriented substantially in the light guide main direction of propagation, wherein the light sources are preferably arranged in a row, in particular side by side and transverse to the light guide main direction of propagation.

Even in the case of just one light source, it is preferably provided that the entry section is designed in the form of a collimator.

With a plurality of light sources, it can also be provided that two light sources each are provided per collimator, for example one of a first colour LED (e.g. white) and a second colour LED (e.g. orange or yellow), whereby the device can produce two light functions, on the one hand the function of daytime running light/position light and, on the other hand, the function of a direction indicator. Homogeneity or beam characteristics are similar for both light functions—the entire light-emitting surface either lights up in the first colour or flashes in the second colour.

It can further be provided that the light-emitting surfaces are directly adjacent to each other, in particular converge in a straight edge, and/or one light-emitting surface is arranged above the other light-emitting surface.

In particular, the two light-emitting surfaces can be inclined at an angle greater than 90° to each other, resulting in a V-shaped arrangement of the two light-emitting surfaces with respect to each other.

It can be provided that when the light-emitting surfaces intersect a horizontal surface, lines of intersection are produced, assuming that the light-emitting surfaces are flat, which lines either run parallel to an excellent straight line, or run obliquely to the excellent straight line, wherein the excellent straight line is a straight line that lies in a horizontal plane and runs perpendicular to the light main direction of propagation.

It can further be provided that a line of intersection that results from a horizontal section through the total internal reflection surface, assuming that the total internal reflection surface is flat, is either parallel to the excellent straight line or oblique to the excellent straight line.

A total internal reflection surface arranged obliquely to the excellent line enables the illumination of, as seen in the main emission direction, obliquely formed light guiding bodies or light-emitting surfaces due to the light rays totally reflected in the corresponding direction.

It can be provided that the upper light-emitting surface is at about the same height as the one or more light sources, and/or wherein the total internal reflection surface is preferably at about the same height as the at least one light source.

It can further be provided that the total internal reflection surface runs transversely to the light guide main direction of propagation, and is preferably inclined in such a way that an upper edge region lies closer to the at least one light source than a lower edge region.

It can be advantageous when the total internal reflection surface is divided into a plurality of facets, wherein facets lie side by side, and wherein the facets are preferably respectively rotated at an angle greater than 0° and less than 90° against the light guide main direction of propagation.

By way of example, each facet constitutes a substantially rectangular, flat surface. The normal vector to this surface can be divided into a horizontal component, which is in a substantially horizontal plane containing the light guide main direction of propagation X, and a vertical component, which is in a vertical plane, which runs normal to the parallel to the substantially horizontal plane.

All facets are preferably rotated by the same angle with respect to the light guide main direction of propagation.

The above-mentioned angle (angle of twist) is the angle that the horizontal component of the normal vector makes to the light guide main direction of propagation.

The facets lie, for example, next to each other in one or more superimposed rows.

The facets have the advantage compared to a non-faceted total internal reflection surface (i.e. in the case of a continuous, flat total internal reflection surface) that in the case of a second light-emitting surface running at an angle to the light guide main direction of propagation, the entire total internal reflection surface would have to be rotated by said angle, whereby this surface would require a lot of installation space.

It can be provided that the at least one light source is designed as an LED or comprises at least one LED.

BRIEF DESCRIPTION OF THE DRAWINGS

The invention is explained in more detail below based exemplary figures. In the FIGS.

DETAILED DESCRIPTION OF EMBODIMENTS OF THE INVENTION

Figure 1:
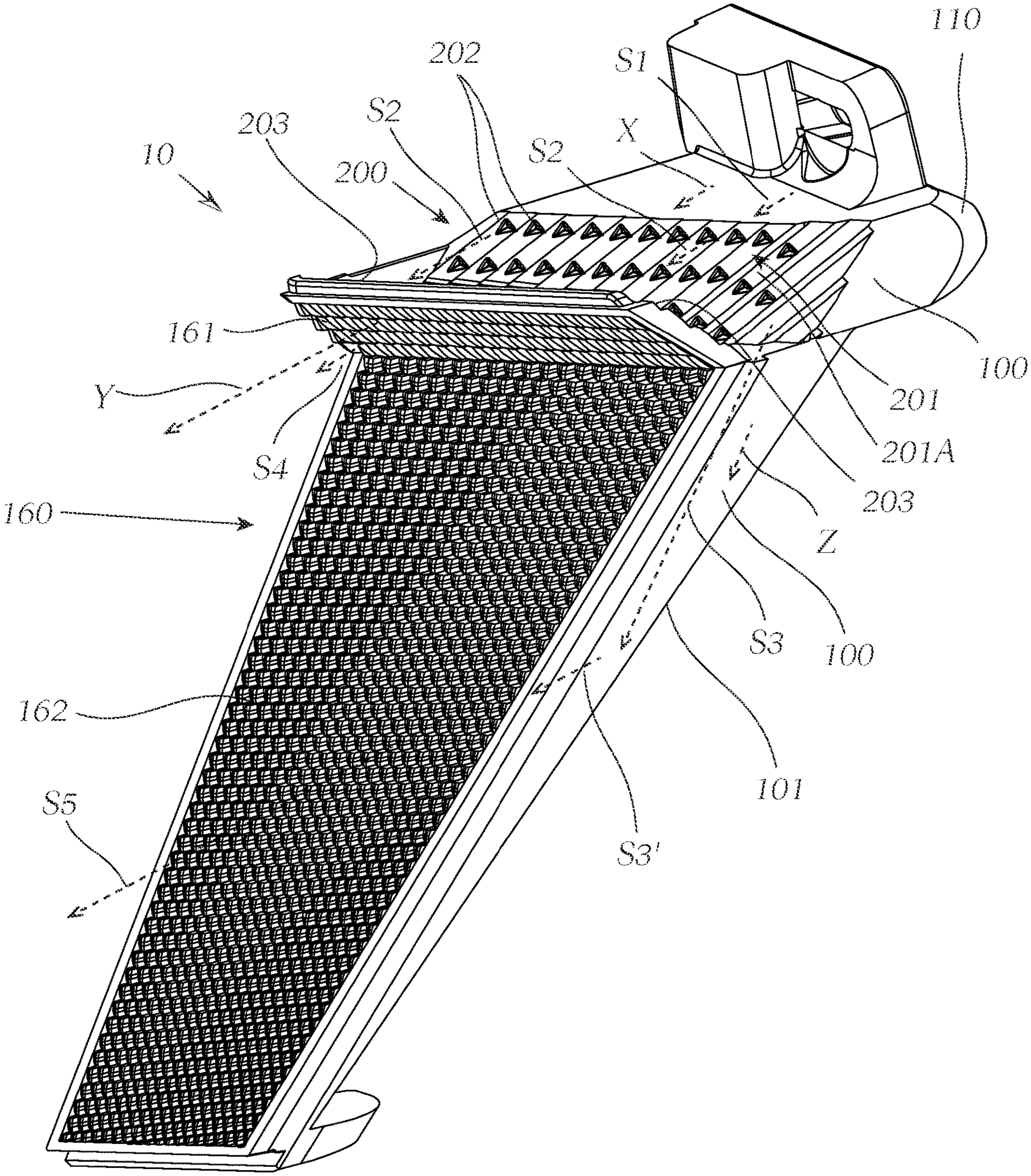
FIG. 1 shows a perspective view of a first embodiment of a device according to the invention.

FIGS. 1-4 show a signal lighting or lighting device 10 for a motor vehicle or for a motor vehicle headlight. The device 10 comprises a light guiding body 100 and light sources 50 associated therewith. The light guiding body 100 has an entry section 110 and a light exit area 160. Light rays emitted by the light sources 50 can enter the light guiding body 100 via the entry section 110, where they propagate in the light guiding body 100, and exit the light guiding body 100 via the light exit area 160.

The entry section 110 is designed in such a way, for example in the form of a collimator 111 or a plurality of collimators, that the light rays emitted by the at least one light source 50 are oriented substantially in a light guide main direction of propagation X and propagate in the direction S1 parallel to the light guide main direction of propagation X in the light guiding body 100.

The light sources 50 are preferably arranged in a row, in particular side by side and transverse to the light guide main direction of propagation X. The light sources are, for example, respectively designed as an LED or comprise at least one LED.

The light exit area 160 comprises two light-emitting surfaces 161, 162. The light-emitting surfaces 161, 162 are directly adjacent to each other and converge in a straight edge. A (first) light-emitting surface 161 lies above the other, second light-emitting surface 162. The two light-emitting surfaces 161, 162 are inclined at an angle preferably greater than 90° to each other, resulting in a V-shaped arrangement of the two light-emitting surfaces with respect to each other.

As shown, the upper light-emitting surface 161 is preferably at about the same height as the one or more light sources 50, and the total internal reflection surface 201 is also preferably at about the same height as the at least one light source 50.

It can be provided that one of the light-emitting surfaces, for example the lower light-emitting surface 162, has a larger surface area than the other, for example the upper light-emitting surface 161.

The light guiding body 100 preferably consists of a transparent solid body, which is made of a transparent material, in which the injected light can propagate.

The light guiding body 100 has a beam splitting device 200, wherein the beam splitting device 200 comprises a total internal reflection surface 201, which totally reflects at least part of the light rays S1 incident thereon such that these totally reflected light rays S3 propagate in the light guiding body 100 in a direction Z deviating from the light guide main direction of propagation X, in particular downwards.

The total internal reflection surface 201 has individual optical structures 202, which are designed in such a way that at least part of the light rays S1 incident on an individual structure 202 exit the light guiding body 100 via the individual structure 202 and enter the light guiding body 100 again via a re-entry surface 203, wherein the re-entered light rays S2 are directed to the first light-emitting surface 161, which is opposite to the re-entry surface 203, such that these light rays exit the first light-emitting surface 161 in a main emission direction Y (light rays S4).

The light-emitting surface 161 and/or the re-entry surface 203 can have optical structures or elements in order to direct the outgoing light S4 in a desired direction (the main emission direction Y).

The light rays S3 totally reflected by the total internal reflection surface 201 are totally reflected again at a rear side 101 of the light guiding body 100 and thereby deflected to the second light-emitting surface 162 (light rays S3'), where the light rays S5 likewise exit the light guiding body 100 in the main emission direction Y.

The second light-emitting surface 162 can in turn have optical structures to emit the light beams S5 in the desired direction and/or to provide for further homogenization of the emitted light.

Figure 2:
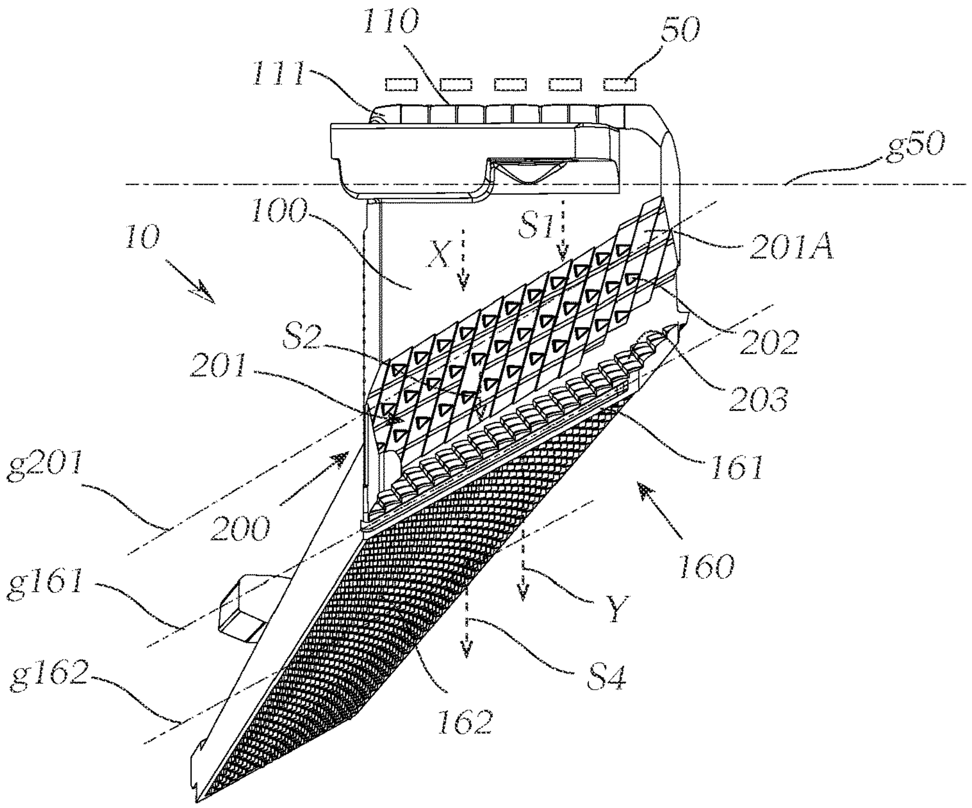
FIG. 2 shows the device from FIG. 1 in a view from above.
Figure 3:
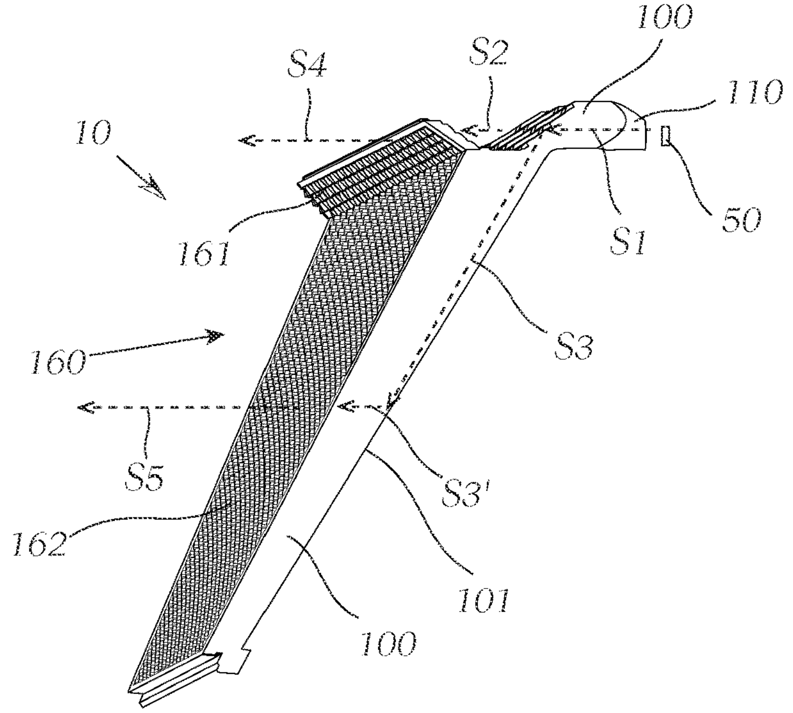
FIG. 3 shows the device from FIG. 1 in a schematic side view.
Figure 4:
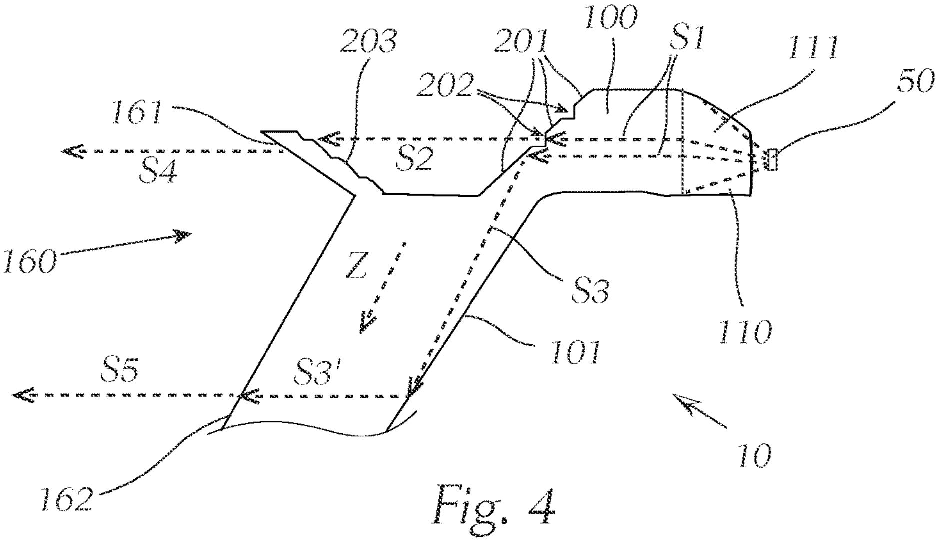
FIG. 4 shows a schematic vertical section through a device from FIG. 1 parallel to the light guide main direction of propagation.

FIGS. 1-4, in particular FIG. 2, show that in this exemplary embodiment, the total internal reflection surface 201, but also the light-emitting surfaces 161, 162, run at an angle to the light guide main direction of propagation X.

This can also be seen in the notional straight lines g50, g161, g162, g201. If the light-emitting surfaces 161, 162 are intersected with a horizontal surface, the lines of intersection g161, g162 are produced, assuming that the light-emitting surfaces 161, 162 are flat.

Furthermore, a so-called "excellent" straight line g50 can be seen, which lies in a horizontal plane and runs perpendicular to the light main direction of propagation X. In the example shown, the row of light sources 50 runs parallel to the excellent straight line g50.

In the present example, the two straight lines g161, g162 now run at an angle to the excellent straight line g50 or at an angle to the light main direction of propagation X.

The straight line g201, which results from a horizontal section through the total internal reflection surface 201, assuming that the total internal reflection surface 201 is flat, also runs at an angle to the excellent straight line g50.

The straight lines g161, g162, g203 can be arranged parallel to one another, but can also be at an angle to one another.

Figure 5:
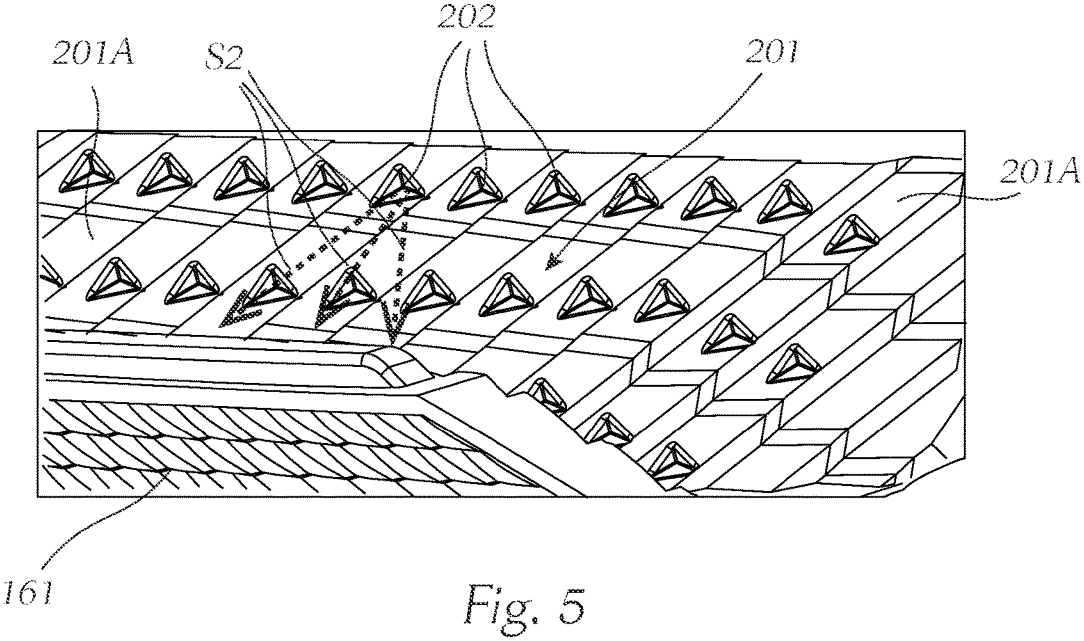
FIG. 5 shows a detailed view of the total internal reflection surface of the device from FIG. 1.
Figure 6:
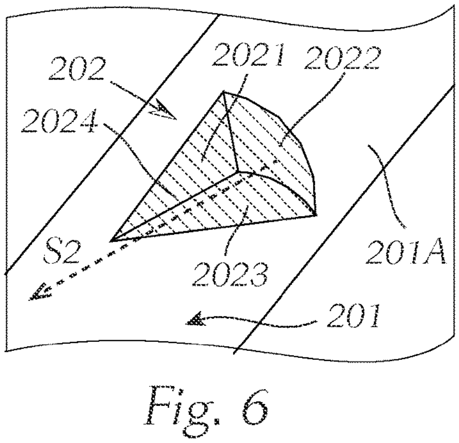
FIG. 6 shows a detailed view of a recess in the total internal reflection surface from FIG. 5.
Figure 7:
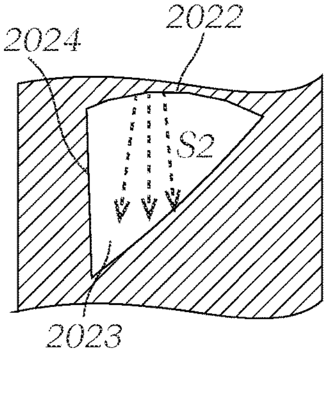
FIG. 7 shows a horizontal section through the recess from FIG. 6.
Figure 8:
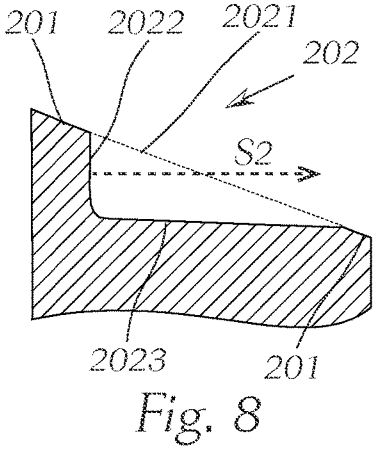
FIG. 8 shows a vertical section parallel to the light guide main direction of propagation through the recess from FIG. 6.
Figure 9:
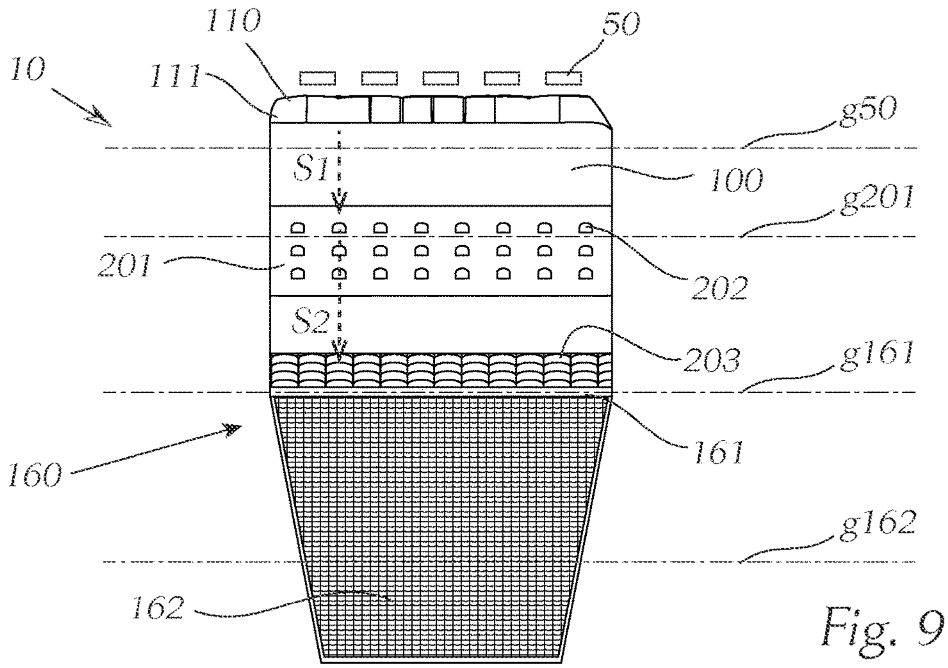
FIG. 9 shows a second embodiment of a device according to the invention in a view from above.
Figure 10:
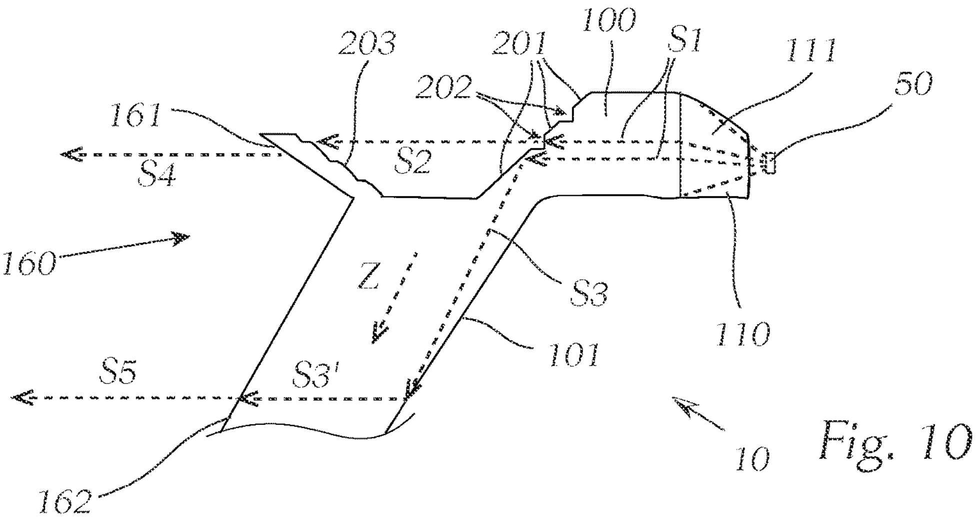
FIG. 10 shows a schematic vertical section through a device from FIG. 9 parallel to the light guide main direction of propagation.
Figure 11:
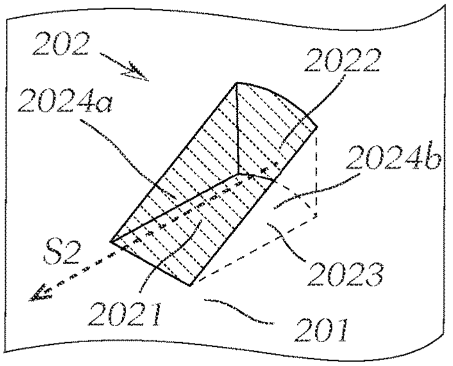
FIG. 11 shows a detailed view of a recess in the total internal reflection surface of the device from FIG. 11.
Figure 12:
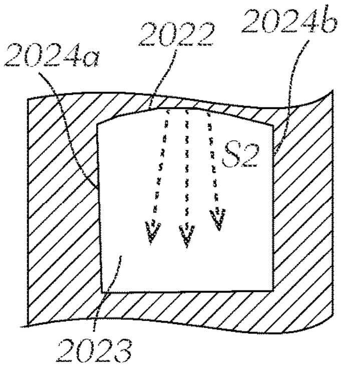
FIG. 12 shows a horizontal section through the recess from FIG. 11.
Figure 13:
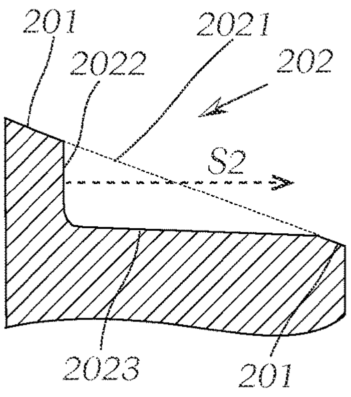
FIG. 13 shows a vertical section parallel to the light guide main direction of propagation through the recess from FIG. 11.

In particular, it can be provided that the individual structures 202 are distributed uniformly and/or in rows and/or in columns over the total internal reflection surface 201, as can be clearly seen in the figures, for example FIG. 1 or FIG. 5.

This ensures that the first light-emitting surface 161, but also the second light-emitting surface 162, is "supplied" with light from the light sources over as full an area as possible.

In the embodiment described based on FIGS. 1-8, it is further advantageously provided that the total internal reflection surface 201 is divided into a plurality of facets 201A, wherein facets 201A lie side by side, and wherein the facets are preferably respectively rotated at an angle greater than 0° and less than 90° against the light guide main direction of propagation X. All facets are preferably rotated by the same angle with respect to the light guide main direction of propagation X.

By way of example, each facet constitutes a substantially rectangular, flat surface. The normal vector to this surface can be divided into a horizontal component, which is in a substantially horizontal plane containing the light guide main direction of propagation X, and a vertical component, which is in a vertical plane, which runs normal to the parallel to the substantially horizontal plane. The above-mentioned angle (angle of twist) is the angle that the horizontal component of the normal vector makes to the light guide main direction of propagation X.

The facets lie, for example, next to each other in one or more superimposed rows The facets have the advantage compared to a non-faceted total internal reflection surface (i.e. in the case of a continuous, flat total internal reflection surface) that in the case of a second light-emitting surface running at an angle to the light guide main direction of propagation, the entire total internal reflection surface would have to be rotated by said angle, whereby this surface would require a lot of installation space. Thanks to the faceting, it is not necessary to rotate a large, continuous surface, rather "only" a number/plurality of small surfaces are rotated, which only take up a small amount of installation space thanks to their considerably smaller extension in the lateral direction compared to a continuous surface.

Coming back to the individual optical structures 202 and when looking at FIGS. 5-8, it can be seen that each individual structure 202 is designed as a recess in the total internal reflection surface 201 or more precisely as a recess in the light guiding body 100, starting from the total internal reflection surface 201.

Starting from an opening 2021 in the light guiding body 100 (i.e. in the total internal reflection surface), such a recess is delimited by lateral surfaces 2022, 2023, 2024 extending into the light guiding body 100, wherein one of the lateral surfaces, the so-called base surface 2022, is oriented in such a way that light rays S1 incident thereon pass through the base surface 2022 in the direction of the first light-emitting surface 161.

In this example, the recesses 202 are "pyramid-shaped", with a triangular opening 2021 as well as base surface 2022 and the two further lateral surfaces 2023, 2024 extending into the light guiding body 100.

"Triangular" does not necessarily mean that the connecting lines between two corner points of the "triangle" must be straight (in this respect it is a "modified" triangle). Likewise, "pyramid-shaped" means that the design of the recess is similar, but not necessarily identical, to a pyramid, for example by lateral surfaces not being flat, but rather curved.

The two further lateral surfaces 2023, 2024 are preferably flat and are oriented substantially parallel to or in the direction of the light rays incident on the individual structure 202, i.e. preferably parallel to the light guide main direction of propagation X.

This ensures that these lateral surfaces do not influence the light rays striking the recess or influence them as little as possible.

It is preferably further provided that the base surface 2022 is curved, in particular into the light guiding body 100. A surface normal to the base surface 2022 thus runs substantially parallel to the light guide main direction of propagation X, wherein, for example, it is provided that the surface normal runs through the geometric centre point of the lateral surface and runs in particular normal to a tangential surface to the base surface at this centre point.

This curvature can (see FIG. 7) provide a splitting/expanding effect on an incident light beam of parallel light rays S1 such that the light rays are uniformly distributed over the light-emitting surface 161 and it shines uniformly brightly.

In a further embodiment according to FIGS. 9-13, in which the basic interrelationships are the same as in the variant discussed on the basis of FIG. 1 and are not repeated here, it can be provided that the recesses 202 are cylindrical at least in sections. This design of the recesses 202 is advantageous here as in this variant, the excellent straight line g50 and the straight line g161 (for these terms, see the explanations for the variant according to FIG. 1) run parallel to one another (FIG. 9) and run transversely and normal to the light guide main direction of propagation X. In this example, the straight lines g161, g162, g201 also run parallel to the excellent straight line g50.

In this case, the recesses are respectively a "cut-out" in the light guiding body or in the total internal reflection surface, starting from the total internal reflection surface 101, wherein a lateral surface 2022 of the recess is formed in the shape of part of a cylinder jacket. This lateral surface or the height of the cylinder jacket runs substantially vertically.

The incident light rays S1 are directed to the first light-emitting surface 161 via this lateral surface 2022. The lateral surface is preferably curved, in particular into the light guiding body 100 such that, as with the embodiment according to FIG. 1, the light rays S1 are correspondingly "scattered" (splitting/expanding effect on an incident light beam of parallel light rays S1) such that the light-emitting surface 161 is subsequently illuminated more uniformly.

The recess 202 is delimited by three further, preferably flat, lateral surfaces 2023, 2024*a*, 2024*b*, which "open out" into the opening of the recess. By way of example, these surfaces are two outer lateral surfaces 2024*a*, 2024*b* and a base lateral surface 2023, which are preferably flat. These flat lateral surfaces 2023, 2024*a*, 2024*b* preferably extend parallel to the main emission direction X.

In both embodiments, it is provided that each opening 2021 occupies an area, the so-called opening area, on the total internal reflection surface 201, wherein an opening area has an opening surface area $A_{B,i}$, the total internal reflection surface 201 has a total surface area $A_{ges}$, wherein $A_{ges}$ is the sum of all opening surface areas, and the first light-emitting surface 161 has a first surface area $A_1$ and the second light-emitting surface 162 has a second surface area $A_2$, and wherein $$\Sigma_i A_{B,i}/(A_{ges}-\Sigma_i A_{B,i})=A_1/A_2$$

The general formula applies assuming that the recesses, i.e. in particular the openings of the recesses, can be different sizes. It is preferably provided that the recesses, in particular their openings, are the same size, i.e. have the same opening surface area. If n recesses are provided, the above formula is simplified ($A_B$ is the surface area of the opening surface area of a recess) to $$n\ A_B/(A_{ges}-n\ A_B)=A_1/A_2$$

The opening surfaces lie in the plane of the total internal reflection surface, assuming that the total internal reflection surface is flat. As described below, the total internal reflection surface can be faceted, i.e. divided into several, preferably flat facets. In this case, the opening surfaces lie in the plane of the respective facet from which the recess extends into the light guiding body.

In the case of a faceted total internal reflection surface, the surface $A_{ges}$ can be calculated by the sum of the surfaces of the facets 201A, starting from which surfaces the recesses 202 extend into the light guiding body 100.

The design according to the invention ensures that the light emitted by the light source(s) is divided according to the size ratio of the two light-emitting surfaces such that it can be ensured that both light-emitting surfaces are illuminated with the same luminous intensity and thus have the same luminance or surface brightness.

That which is claimed is:

1. A signal lighting or lighting device (10) for a motor vehicle or for a motor vehicle headlight, comprising:

at least one light source (50) for emitting light rays; and a light guiding body (100) associated with the at least one light source (50), wherein:

the light guiding body (100) has an entry section (110) and a light exit area (160), light rays emitted by the at least one light source (50) enter the light guiding body (100) via the entry section (110), propagate in the light guiding body (100), and exit the light guiding body (100) via the light exit area (160), the light exit area (160) comprises two light-emitting surfaces (161, 162), the entry section (110) is designed in such a way that the light rays emitted by the at least one light source (50) are oriented substantially in a light guide main direction of propagation (X), the light guiding body (100) comprises a beam splitting device (200), wherein the beam splitting device (200) comprises a total internal reflection surface (201), which is configured to totally reflect at least part of the light rays (S1) incident thereon such that these light rays (S3) propagate in the light guiding body (100) in a direction (Z) deviating from the light guide main direction of propagation (X), the total internal reflection surface (201) has individual optical structures (202), which are configured such that at least part of the light rays (S1) incident on an individual structure (202) exit the light guiding body (100) via the individual structure (202), enter the light guiding body (100) again via a re-entry surface (203), wherein the re-entered light rays (S2) are directed to one of the light-emitting surfaces, the “first” light-emitting surface (161), which first light entry surface (161) is opposite to the re-entry surface (203), such that these light rays can exit the first light-emitting surface (161) in a main emission direction (Y), the light rays (S3) totally reflected by the total internal reflection surface (201) are totally reflected at a rear side (101) of the light guiding body (100) and thereby deflected to the second light-emitting surface (162), where the light rays (S5) exit the light guiding body (100) in the main emission direction (Y), each individual optical structure (202) is designed as a recess in the total internal reflection surface (201), wherein each recess, starting from an opening (2021) in the light guiding body (100), is delimited by lateral surfaces (2022, 2023, 2024; 2022, 2023, 2024*a*, 2024*b*) extending into the light guiding body (100), one of the lateral surfaces, the so-called base surface (2022), is oriented in such a way that light rays (S1) incident thereon pass through the base surface (2022) in the direction of the first light-emitting surface (161), and each opening (2021) occupies an area, the so-called opening area, on the total internal reflection surface (201), wherein an opening area has an opening surface area $A_{B,i}$, the total internal reflection surface (201) has a total surface area $A_{ges}$, wherein $A_{ges}$ is the sum of all opening surface areas, and the first light-emitting surface (161) has a first surface area $A_1$ and the second light-emitting surface (162) has a second surface area $A_2$, wherein $$\Sigma_i A_{B,i}/(A_{ges}-\Sigma_i A_{B,i})=A_1/A_2$$

2. The device according to claim 1, wherein the further lateral surfaces (2023, 2024; 2023, 2024*a*, 2024*b*) are oriented substantially parallel to or in the direction of the light rays incident on the individual structure (202).

3. The device according to claim 1, wherein the recesses (202) are pyramid-shaped, with a triangular opening (2021), base surface (2022) and two lateral surfaces (2023, 2024) extending into the light guiding body (100).

4. The device according to claim 1, wherein the recesses (202) are cylindrical at least in sections.

5. The device according to claim 1, wherein the base surface (2022) is curved into the light guiding body (100), wherein the other lateral surfaces (2023, 2024; 2023, 2024*a*, 2024*b*) are flat, wherein the flat lateral surfaces (2023, 2024) extend parallel to the light guide main direction of propagation (X).

6. The device according to claim 1, wherein the individual structures (202) are distributed uniformly and/or in rows and/or in columns over the total internal reflection surface (201).

7. The device according to claim 1, wherein two or more light sources (50) are provided, wherein the entry section (110) is designed in such a way respectively for one or for more of the light sources (50) that the light rays emitted by each light source (50) are oriented substantially in the light guide main direction of propagation (X).

8. The device according to claim 1, wherein the light-emitting surfaces (161, 162) are directly adjacent to each other and/or one light-emitting surface (161) is arranged above the other light-emitting surface (162).

9. The device according to claim 1, wherein when the light-emitting surfaces (161, 162) intersect a horizontal surface, the resulting lines of intersection (g161, g162), assuming that the light-emitting surfaces (161, 162) are flat, either run parallel to an excellent straight line (g50), or run obliquely to the excellent straight line (g50), wherein the excellent straight line (g50) is a straight line that lies in a horizontal plane and runs perpendicular to the light main direction of propagation (X).

10. The device according to claim 9, wherein a line of intersection (g201) that results from a horizontal section through the surface (201) is either parallel to the excellent straight line (g50) or oblique to the excellent straight line (g50).

11. The device according to claim 1, wherein the upper light-emitting surface (161) is at about the same height as the one or more light sources (50), and/or wherein the total internal reflection surface (201) is at about the same height as the at least one light source (50).

12. The device according to claim 1, wherein the total internal reflection surface (201) is divided into a plurality of facets (201A), wherein facets (201A) lie side by side.

13. The device according to claim 1, wherein the at least one light source (50) is designed as an LED or comprises at least one LED.

14. A motor vehicle headlight comprising one or more devices according to claim 1.

15. A motor vehicle comprising one or more devices according to claim 1.

16. The device according to claim 1, wherein the entry section (110) is in the form of a collimator (111).

17. The device according to claim 7, wherein the entry section (110) is in the form of a collimator (111).

18. The device according to claim 7, wherein the light sources (50) are arranged in a row, side by side and transverse to the light guide main direction of propagation (X).

19. The device according to claim 8, wherein the light-emitting surfaces (161, 162) are directly adjacent to each other and converge in a straight edge.

20. The device according to claim 12, wherein the facets are respectively rotated at an angle greater than 0° and less than 90° against the light guide main direction of propagation (X).

* * * * *